Aug. 14, 1956 W. R. ELLIS 2,759,089
TEMPERATURE CONTROL CIRCUIT
Filed April 2, 1954 2 Sheets-Sheet 1

INVENTOR
WALTER R. ELLIS
BY
ATTORNEY

Aug. 14, 1956  W. R. ELLIS  2,759,089
TEMPERATURE CONTROL CIRCUIT
Filed April 2, 1954  2 Sheets-Sheet 2

INVENTOR
WALTER R. ELLIS
BY

*Spencer E. Olson*
ATTORNEY

United States Patent Office 2,759,089
Patented Aug. 14, 1956

2,759,089

TEMPERATURE CONTROL CIRCUIT

Walter R. Ellis, Boston, Mass., assignor to Tracerlab, Inc., Boston, Mass., a corporation of Massachusetts Application April 2, 1954, Serial No. 420,500

5 Claims. (Cl. 219—20)

This invention relates generally to electronic control circuits, and is more particularly concerned with new and improved means for accurately maintaining the temperature of a circuit component at a predetermined temperature.

For convenience, the invention will be described as applied to a radiation-type thickness gauge wherein it is necessary to maintain the temperature of a resistor at a fixed temperature to minimize drift and attendant errors in a measuring circuit introduced by changes in ambient temperature, but it will be understood that the same is equally applicable in other situations where control of temperature is desired, and as will later appear, may be utilized to control functions other than temperature.

In one type of radiation-type thickness gauge, a source of penetrative radiations is disposed on one side of a material to be measured and a detector yielding an output current which is a function of intensity of incident radiation is placed on the other side thereof, opposite the source. Radiations are absorbed by the material in a manner now well known in the art and the degree of absorption is a measure of the weight per unit of area of such material, and where the density is uniform, the gauge may be calibrated directly to indicate thickness. The usual detector and indicating circuit, in its most elementary form, comprises an ionization chamber, an electrometer tube having a high megohm grid resistor and a meter in the anode circuit to indicate the current flow in the tube. Inasmuch as the ionization currents produced by the chamber are extremely minute, of the order of $10^{-8}$ ampere, the grid resistor of the electrometer tube is high value, of the order of $10^9$ ohms, small changes in the resistance of the grid resistor occasioned by changes in ambient temperature seriously affect the signal applied to the grid of the electrometer tube and introduce errors in measurement.

Previous attempts to eliminate the effects of changes in temperature on the resistor consisted of positioning the resistor within a brass slug around which was wrapped a heating element through which current was passed to heat the resistor to a temperature above the expected maximum ambient temperature. A thermostat was positioned within the slug in a region having a temperature comparable to that of the resistor to measure the temperature of the slug, and connected to regulate the current flow in the heating element to maintain a constant temperature. This prior art method has been reasonably satisfactory, but since the thermostat provides an on-off control of the heater current, cyclic variations in temperature of the resistor result. These variations have a period of 10 to 30 seconds, depending on the type of thermostat used and the difference between the ambient and controlled temperatures, and an amplitude of approximately 0.05° C. This cyclic deviation introduces a similar cyclic error in the indicated thickness of the material being measured, thus impairing the usefulness of the gauge for certain purposes. It is desirable to maintain the temperature of the resistor within closer tolerances than .05° C. and to eliminate the cyclic variation inherent in the above-described prior art method.

With an appreciation of the foregoing limitations and shortcomings of present temperature control circuits, applicant has as a primary object of his invention the provision of an improved temperature control circuit.

A more specific object of the invention is to provide a control circuit for maintaining the temperature of a circuit component, a resistor, for example, at a predetermined value with smaller deviations from that value than is possible with heretofore known systems.

A further object of the invention is to provide a wholly electronic control circuit for maintaining constant the temperature of a circuit component which is operative to eliminate cyclic variation in the value of the controlled temperature and to reduce the magnitude of such variations.

With the foregoing objects and others which will hereinafter appear in view, the invention is featured by a circuit including an alternating current bridge including a thermistor as a temperature sensing element, an amplifier for amplifying any error signal generated across the bridge, a phase-sensitive amplifier for controlling the current through a heating element surrounding the thermistor and the element to be temperature-controlled, and a novel damping circuit associated with the phase-sensitive amplifier to reduce the gain thereof at the frequency of the inherent time lag between application of heat and sensing thereof by the thermistor whereby oscillation of the system is substantially eliminated.

With the foregoing objects, features and advantages in mind, a more complete understanding of the invention may be had from the following detailed description of a preferred embodiment thereof taken in connection with the accompanying drawings in which like numerals refer to like parts in the several views and in which.

Figure 1:
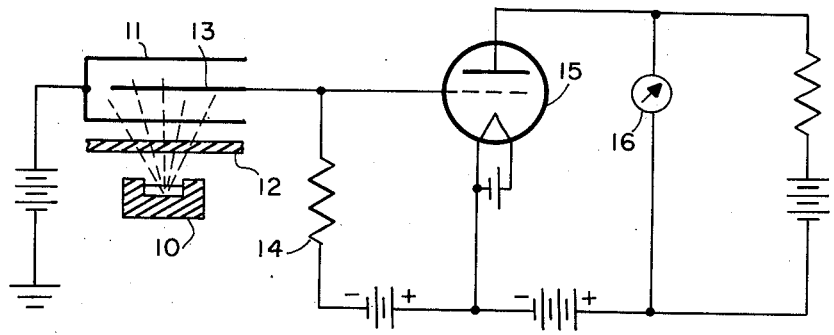
Fig. 1 is a simplified schematic representation of an absorption type radiation thickness gauge.

Referring to Fig. 1, the radiation type thickness gauge in which the present invention finds particular applicability, generally includes a radioactive source 10 and an ionization chamber detector 11 between which the material 12 to be measured is placed or caused to move. Radiation from the source 10 passes through the material 12, the non-absorbed radiation entering the sensitive volume of chamber 11 causing ionization therein, the resulting ionization current being collected by the center electrode 13. The magnitude of the current collected in this manner is a function of the thickness of the material 12 as is now well known to persons working in this art. Current from the ionization chamber 11 flows through the high megohm resistor 14, causing a signal voltage to appear at the grid of the electrometer tube 15. This signal is amplified by the tube 15, the magnitude of the amplified signal being shown on meter 16 or other suitable indicator, which preferably is calibrated in units of thickness or weight per unit area. The circuitry of an actual gauge of this type includes associated control equipment, recorders and the like to render it suitable for industrial use, but what has been shown is believed to be sufficiently complete for purposes of describing the utility therein of the present invention.

As was noted earlier, the current from ionization chamber 11 being extremely small, and resistor 14 being of very high value, small changes in the temperature of resistor 14 introduce variations in the signal developed thereacross with a consequent error in the indicated thickness of the material. It is desirable therefore to maintain resistor 14 at a constant temperature, preferably above the highest ambient temperature to which the instrument is expected to be subjected, to minimize drift and errors from this cause. To achieve such control, resistor 14 is inserted in a brass slug 17 (Fig. 2) around which is wrapped a heating coil 18 through which current is passed. A thermistor 19 is placed in another slot to sense the temperature of the slug, and is connected in the circuit of the present invention to be described hereinbelow in such a manner as to regulate the current flow in winding 18 in order to maintain a constant temperature. The entire slug assembly, including the heater winding is covered with a heat insulating material, such as a layer of felt 20, to minimize the effect of sudden variations in ambient temperature.

Figure 2:
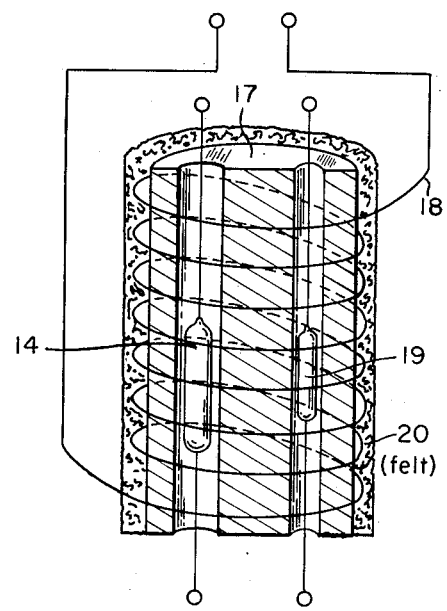
Fig. 2 is an elevation section diagram of the assembly of the heater, the thermistor sensing element and the component whose temperature is to be controlled.
Figure 3:
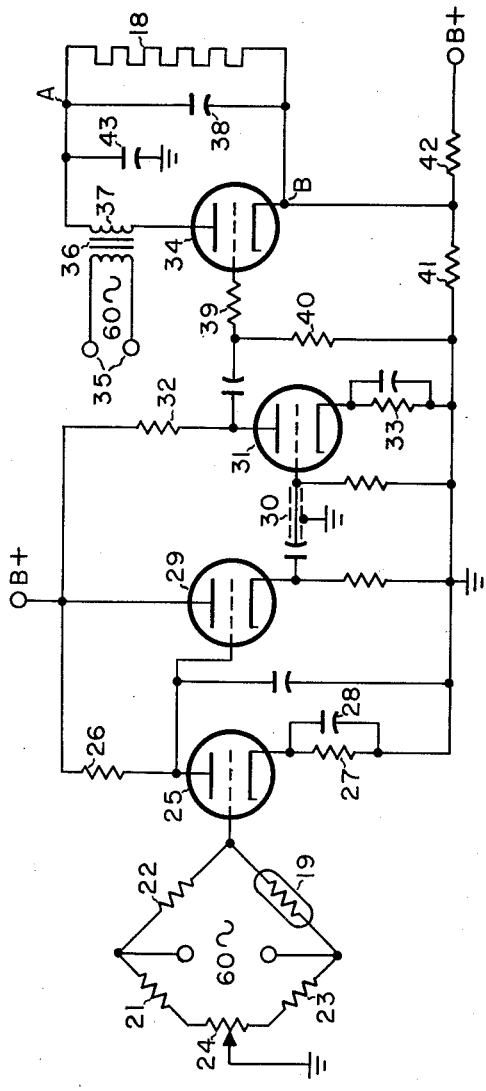
Fig. 3 is a circuit of a preferred embodiment of the control circuit of the invention.

Referring now to Fig. 3, the thermistor 19, mechanically positioned as shown in Fig. 2, is connected as one arm of a bridge further consisting of resistors 21, 22 and 23 across which is applied a 60 cycle alternating current voltage of a convenient amplitude, for example, 6.3 volts. A potentiometer 24 is connected between resistors 21 and 23, with its movable tap connected to ground, to balance the bridge at a predetermined temperature. The voltage resulting from the unbalance of the bridge is an alternating current signal dependent in phase and amplitude upon the direction and magnitude of unbalance as introduced by the change of resistance of thermistor 19 with temperature. The unbalance voltage signal is amplified by voltage amplifier 25 having load resistor 26 and a cathode resistor 27 by-passed by capacitor 28. The output signal from the plate of tube 25 may then be directly amplifier further, but is preferably passed through a cathode follower 29 prior to coupling the signal through shielded cable 30 from the detecting head (in which the thermistor 19 and heating element 18 are located) to a control circuit console which preferably is positioned at some distance from the detecting head. It will be understood that the use of the cathode follower 29 is a design expedient to permit the physical separation of the bridge circuit and amplifier 25 from the remainder of the circuit, and not a limiting feature of the invention. After transmission through the cable 30, the signal is further amplified by amplifier 31, having plate load resistor 32, and cathode resistor 33, and then applied to the grid of a high permeance tube 34.

The anode of tube 34 is energized by alternating voltage coupled from a source designated by terminals 35 by transformer 36 having its secondary 37 connected in the anode circuit. This voltage is of a convenient magnitude, say 100 volts, and is in phase with the voltage applied across the bridge circuit described earlier. Thus, with two phase inversions introduced by amplifiers 25 and 31, the voltage at the anode of tube 34 is in phase with the voltage at its grid when thermistor 19 has a high resistance (detected temperature low) and 180° out of phase with the grid voltage when thermistor 19 has a low resistance, i. e., when the detected temperature is high. Heating element 18 is connected in series with secondary winding 37 to the cathode of tube 34, with condenser 38 connected in parallel therewith. The grid of tube 34 is connected to ground through resistors 39 and 40, and the cathode is connected to the junction of resistors 41 and 42 connected between B+ and ground as shown. Circuit values are so chosen, particularly resistors 41 and 42 and B+, in an illustrative example, such that under equilibrium conditions (i. e. with little or no unbalance of the bridge) the grid of tube 34 is at substantially ground potential, D. C.-wise, and the cathode is at 28 volts positive with respect to ground. Under this condition, a current flows in heating element 18 in an amount such that the heat is dissipated as fast as it is applied whereby the bridge is maintained in balance at the desired temperature.

When, however, thermistor 19 detects a temperature below the desired temperature, the bridge is unbalanced, causing an alternating voltage to be impressed on the grid of tube 34 which is in phase with the voltage on the plate of the tube. When the grid voltage is positive simultaneously with the plate, a pulsating direct current is caused to flow in the loop consisting of tube 34, winding 37, condenser 38 and heating element 18. The alternating component is filtered somewhat by condenser 38 and the direct component flows through resistor 18 which functions to heat the controlled element (e. g. resistor 14 in Figs. 1 and 2).

Because the thermistor 19 is separated from the heating element 18 by a finite quantity of brass (Fig. 2) there is a time lag between the application of power to heating element 18 and the detection by the thermistor of the resulting temperature rise, this delay being of the order of 10 seconds in the embodiment constructed by applicant. Since the above-described circuit is a closed-loop servo system having a gain greater than unity at frequencies engendered by this time lag, the system will "hunt" about the desired temperature. That is, more heat is applied to the slug 17 than is necessary to bring the temperature up to the desired value before the thermistor detects the change, and likewise thermistor allows the slug to cool to a temperature lower than the desired temperature before calling for additional heat. Oscillations of this sort are obviously objectionable, and are desirably minimized or eliminated.

In accordance with the present invention, oscillation of the system is substantially eliminated by reducing the gain of the servo loop at the "hunting" frequency, which, assuming a 10 second time lag (or 20 seconds for a complete cycle) is of the order of 0.05 cycle per second. Conventional methods of loop gain reduction are not readily applicable in view of the fact that the amplifier operates at 60 cycles per second up to the grid of tube 34 while the "hunting" oscillations are at a very much lower frequency, and because of the impedance levels and phase-relationships in the circuitry associated with tube 34 consisting of condenser 43 and resistors 41 and 42.

Assuming the illustrative voltage conditions mentioned above, under equilibrium conditions the cathode of tube 34 (point B) is 28 volts positive with respect to ground, and the average potential of the grid of tube 34 is zero volts with respect to ground. With this bias on the tube, and energization of the tube from A. C. source 35 at about 100 volts, there is a circulatory current in the loop including tube 34, winding 37 and heating element 18 of a magnitude such that there is a voltage of about 25 volts across resistor 18 whereby point A is about 3 volts positive with respect to ground. If thermistor 19 now detects a temperature below the desired controlled temperature and calls for more heat, the potential at the grid of tube 34 is in phase with the plate energizing potential causing an increase in current through the loop including tube 34, and an increase in voltage across resistor 18, for example, to 30 volts. Since point A cannot instantaneously change in potential because of condenser 43, the voltage at point B becomes 5 volts more positive, thus increasing the grid bias of tube 34 and preventing the current through resistor 18 to reach its full value, as called for by thermistor 19, at a rate which cannot be followed by the thermistor. Point B is maintained at a more positive value for the time it takes to charge condenser 43, through resistors 40 and 41. The time constant of this charging circuit (the resistance of heating element 18 is negligible) is of the order of 10 seconds, whereby point B is initially at +33 volts (in the example given) and then is gradually reduced in potential as condenser 43 charges. In this way, the current build-up in heating element 18 is at a rate which can be followed by the thermistor and the system accordingly will not "hunt" or oscillate.

If the thermistor 19 detects a temperature which is too high and calls for less heating current, the damping system just decribed is operative to temporarily reduce the bias on tube 33 thereby preventing the decrease in heater current at too rapid a rate.

From the foregoing description it will be perceived that there has been provided a very simple circuit for solving a difficult problem. The damping circuit does not require critical components and is not prone to hum pick-up. The circuit eliminates the need for filtering out or generating compensating 60 cycle voltages, and allows a time lag to be present in the servo loop thus allowing considerable freedom in the mechanical construction of the temperature detector. A specific embodiment of the circuit, using a 6080 as tube 34 (a twin triode, high permeance tube), with resistor 41 and 42 having values of 1 meg and 4.7 meg, respectively, and condenser 43 having a value of 10 microfarads, and with B+ of a value of 150 volts, has been found capable of maintaining the temperature of a resistor (resistor 14 of Fig. 2) at a temperature of 90° C.±.01°.

Figure 4:
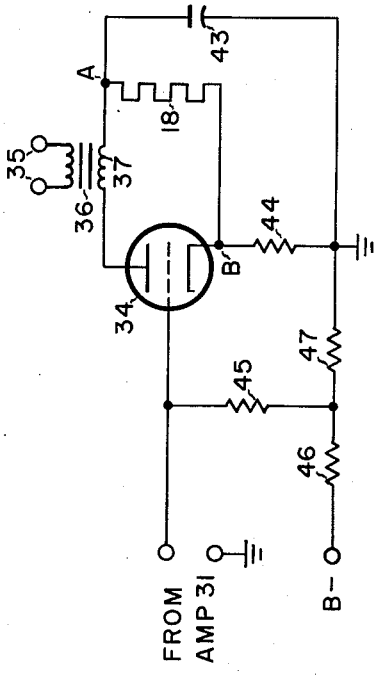
Fig. 4 is a circuit diagram illustrating a modification of a portion of the circuit of Fig. 3.

While a preferred embodiment of the invention has been illustrated in Fig. 3, it will be understood that wide variations in the value of circuit components may be employed, depending upon the time lag in the system and the voltage available, without departing from the spirit of the invention. Likewise, the damping circuit need not be connected as shown in Fig. 3, an alternate arrangement being shown in Fig. 4, which is a circuit diagram of tube 34 and its associated circuitry, the rest of the circuit being identical with that described in connection with Fig. 3. In this case, the tube is energized from alternating source 35 as before, with heating element 18 connected in series with winding 37 between the anode and cathode of the tube. The cathode of the tube is connected to ground via resistor 44, and the damping condenser 43 is connected from a point A to ground as in Fig. 3. The grid of the tube is maintained negative with respect to ground by connection thereof through resistor 45 to the junction of resistors 46 and 47 connected between a source of negative voltage and ground. When the thermistor calls for increased current, point B is temporarily raised in potential, thereby increasing the bias on the tube, for a period determined by the time constant $C_{43}R_{44}$. Basically, then, the operation is the same as in the Fig. 3 circuit, except that bias is applied to the grid instead of to the cathode.

While the foregoing description has been limited to certain preferred embodiments of the invention, it will be understood that modifications will be apparent to one skilled in the art and may be made and that no limitations are intended other than those imposed by the scope of the appended claims.

What is claimed is:

1. In combination, a heating element for supplying heat to a temperature-controlled region, a bridge circuit including a resistance element having a large temperature coefficient for sensing changes in temperature within said region, said changes in temperature being detected after a time lag of predetermined period following a change in heat supplied to said region, a source of alternating voltage connected across said bridge circuit, the period of said voltage being appreciably shorter than the period of the time lag between the application of heat to said region and the sensing thereof by said resistance element, said bridge circuit being adapted to produce an error signal having the frequency of said source and phase and amplitude dependent upon the deviation of the temperature within said region from a predetermined value, an amplifier energized from said source of alternating voltage, means coupling said error signal to said amplifier, said amplifier being arranged to control the current to said heating element in response to the phase and amplitude of said error signal, and a resistance-capacitance network having a time constant comparable to the period of said time lag connected in circuit with said amplifier arranged to reduce the gain of said amplifier for the period of the time lag between the application of heat to said region and the sensing thereof by said resistance element.

2. A system for controlling the temperature of an electrical component comprising, in combination, a heat conducting slug having a recess herein for receiving said component, an electrical heating element surrounding said slug, an alternating current bridge circuit including a thermistor disposed within said slug for sensing changes in temperature thereof after a time lag of predetermined period following a change in the heat supplied to said slug by said heating element, a phase-sensitive amplifier having said heating element connected in series therewith, means including an amplifier for coupling an error signal from said bridge circuit to said phase-sensitive amplifier, said phase-sensitive amplifier being arranged to control the current through said heating element to maintain the error signal from said bridge circuit at substantially zero value, and a damping circuit having a time constant comparable to the period of said time lag connected to said phase-sensitive amplifier and arranged to reduce the gain thereof for the period of the time lag between the application of heat to said slug and the sensing thereof by said thermistor.

3. A system for maintaining a circuit component at a predetermined temperature within close limits comprising, in combination, a heat conducting slug having a recess herein for receiving said component, an electrical heating element surrounding said slug, a bridge circuit including a resistance element which appreciably changes in value with temperature, said resistance element being disposed within said slug and responsive to detect changes in temperature after a time lag of predetermined period following a change in the heat supplied to the slug, a source of alternating voltage connected across said bridge circuit, said bridge circuit being adapted to provide an error signal having a phase and amplitude dependent upon the direction and amount of deviation in temperature of said resistance element from said predetermined temperature, a phase-sensitive amplifier including a high permeance tube having at least cathode, control grid and anode electrodes with said heating element connected between the anode and cathode thereof, means in the anode circuit of said tube arranged to energize said tube from said alternating current source, means coupling the error signal from said bridge circuit to the control grid of said tube, and a resistance-capacitance network having a time constant comparable to the period of said time lag connected in circuit with said tube arranged to reduce the gain of said phase-sensitive amplifier for the period of the time lag between the application of heat to said slug and the sensing thereof by said resistance element.

4. A system for controlling the temperature within a heat conducting slug comprising, in combinaion, an electrical heating element arranged to supply heat to said slug, an alternating current bridge circuit including a thermistor disposed within said slug or sensing changes in temperature within the slug after a time lag period following a change in heat supplied to said slug by said heating element, a phase-sensitive amplifier having said heating element connected in series therewith, means coupling an error signal from said bridge circuit to said phase-sensitive amplifier, said amplifier being arranged to control the current through said heating element to maintain the error signal from said bridge circuit at substantially zero value, and a damping circuit having a time constant comparable to the period of said time lag connected in circuit with said phase-sensitive amplifier and arranged to reduce the gain thereof for the period of the time lag between the application of heat to said slug and the sensing thereof by said thermistor.

5. A system for maintaining a predetermined temperature in a cavity within a heat conducting slug comprising, in combination, an electrical heating element arranged to supply heat to the exterior of said slug, a bridge circuit including a resistor which appreciably changes in resistance with temperature, said resistor being disposed within said slug for sensing changes in temperature within the slug after a time lag period following a change in heat supplied to said slug by said heating element, a source of alternating voltage connected across said bridge circuit, said bridge circuit being arranged to provide an error signal having a phase and ampliude dependent upon the direction and amount of deviation in temperature of said resistor from said predetermined temperature, a phase-sensitive amplifier including an electron tube having at least an anode, a control grid and a cathode with said heating element connected between said anode and cathode, means connected in the anode circuit of said tube arranged to energize said tube from said alternating current source, means coupling the error signal from said bridge circuit to the control grid of said tube, and a damping circuit having a time constant comparable to the period of said time lag connected in circuit with said amplifier and arranged to reduce the gain thereof for the period of the time lag between the application of heat to said slug and the sensing thereof by said resistance element.

References Cited in the file of this patent
UNITED STATES PATENTS

| | | |
|---|---|---|
| 2,126,398 | Knowles | Aug. 9, 1938 |
| 2,375,988 | Gille et al. | May 15, 1945 |
| 2,396,196 | Pearson | Mar. 5, 1946 |
| 2,477,819 | Newell | Aug. 2, 1949 |
| 2,560,389 | Olving | July 10, 1951 |